US006830642B2

(12) United States Patent
Greenhill et al.

(10) Patent No.: US 6,830,642 B2
(45) Date of Patent: Dec. 14, 2004

(54) METHOD AND APPARATUS FOR APPLYING PRESSURE SENSITIVE ADHESIVE LABELS TO A SERIES OF OBJECTS MOVING IN MULTIPLE COLUMNS

(76) Inventors: Charles E. Greenhill, 46 Autumn Tide, Lakewood, NJ (US) 08701; James Nogrady, 50 Liberty St., Passaic, NJ (US) 07055

( * ) Notice: Subject to any disclaimer, the term of this patent is extended or adjusted under 35 U.S.C. 154(b) by 0 days.

(21) Appl. No.: 10/389,593

(22) Filed: Mar. 17, 2003

(65) Prior Publication Data

US 2004/0182505 A1 Sep. 23, 2004

(51) Int. Cl.[7] .......................... B32B 31/20; B65C 9/00; B65C 9/18; B65C 9/28

(52) U.S. Cl. ...................... 156/230; 156/235; 156/239; 156/540; 156/542; 156/566; 156/DIG. 33

(58) Field of Search .......................... 156/64, 230, 235, 156/238, 247, 249, 289, 240, 541, 542, 566, 582, DIG. 24, DIG. 28, DIG. 31, DIG. 33, DIG. 38, DIG. 39

(56) References Cited

U.S. PATENT DOCUMENTS 4,024,011 A * 5/1977 Crankshaw et al. ........ 156/299
4,210,484 A * 7/1980 Crankshaw et al. ........ 156/542
5,387,302 A * 2/1995 Bernard et al. ............. 156/352
5,489,360 A * 2/1996 Shimizu et al. ............. 156/542
5,645,680 A * 7/1997 Rietheimer ................. 156/567
5,676,629 A * 10/1997 Andersson .................. 493/379
5,968,303 A * 10/1999 Nagasaka ................... 156/249
6,047,755 A * 4/2000 Anderson et al. ........... 156/351
6,179,030 B1 * 1/2001 Rietheimer ................. 156/360
6,596,105 B2 * 7/2003 Kendall, Jr. ................. 156/64

* cited by examiner

*Primary Examiner*—J. A. Lorengo
(74) *Attorney, Agent, or Firm*—Clifford G. Frayne

(57) ABSTRACT

A method and apparatus for transferring a discrete pressure sensitive label from a plurality of continuous webs of discrete pressure sensitive labels to a continuous series of discrete objects moving in multiple columns wherein the web and labels are mounted to a plurality of label stations removably mounted to a bridge member providing common utilities to each of the plurality of label stations, the web and labels are brought into contact tangentially with a perforated rotating transfer machine mounted on a hub, the web and labels in contact with the perforated rotating transfer means for a portion of its arc of circumference, the label being subjected to a vacuum during rotation while simultaneously redirecting the web away from the perforated rotating transfer means, the label maintaining contact with the rotating transfer means until registration with a pressure port at which point the label is subjected to a pressurized gas flow and is blown from the rotating ting to the object to be labeled when that object is in registration and alignment with the pressure port.

12 Claims, 9 Drawing Sheets

FIG. 1
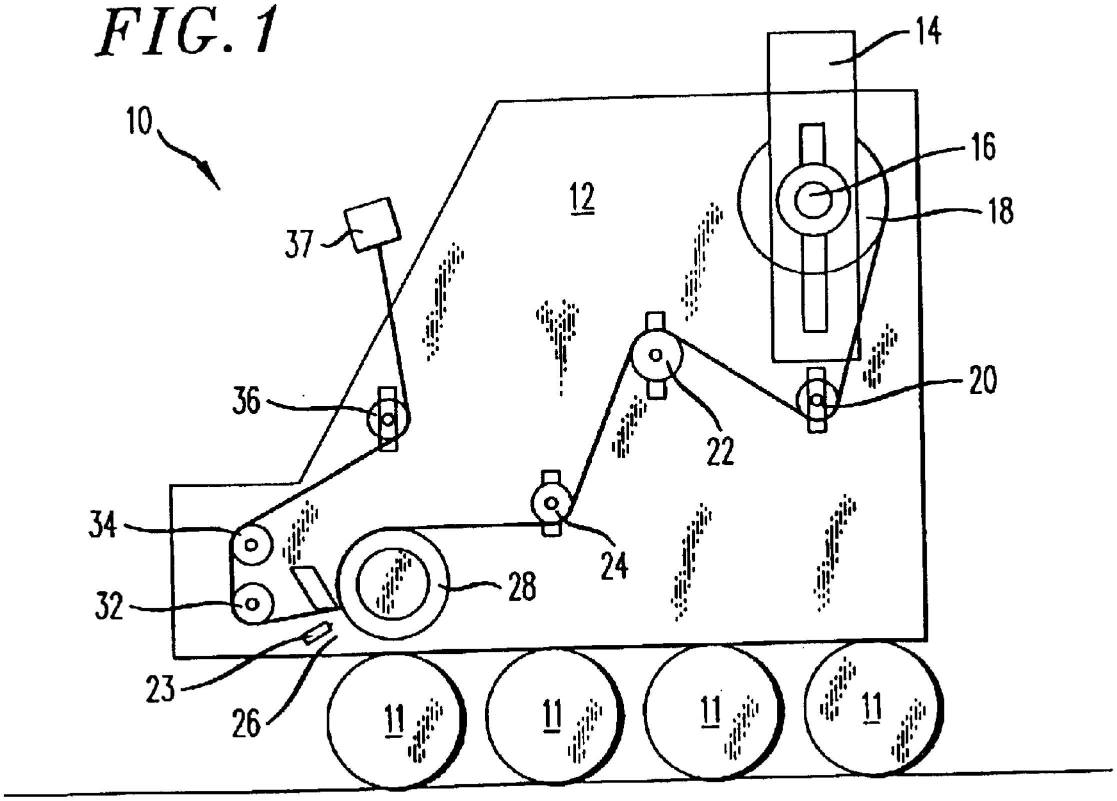
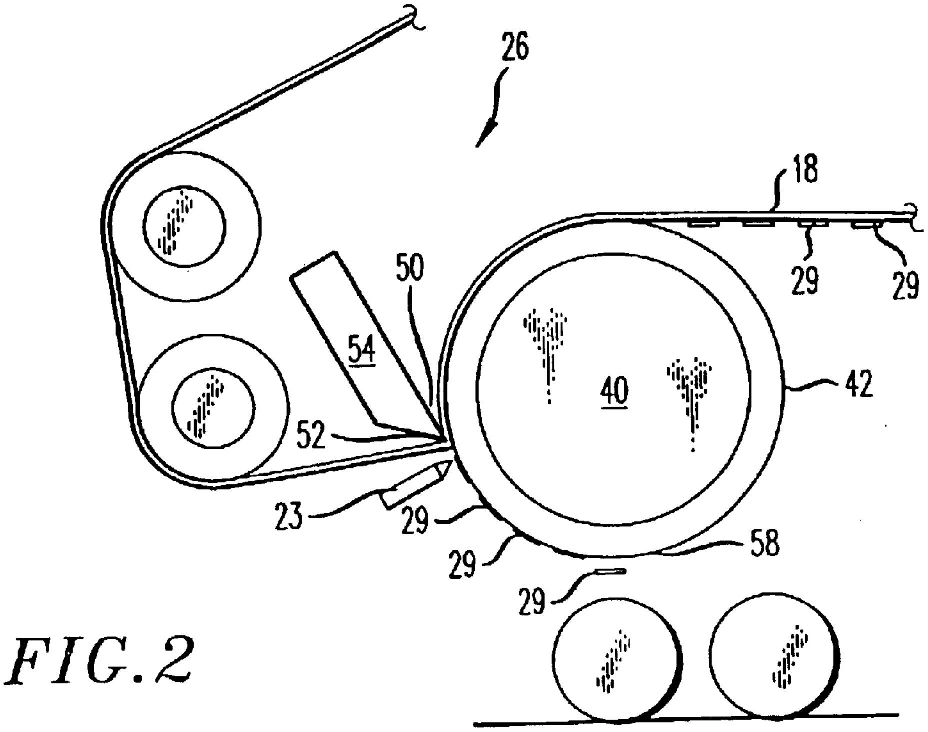
FIG. 2

METHOD AND APPARATUS FOR APPLYING PRESSURE SENSITIVE ADHESIVE LABELS TO A SERIES OF OBJECTS MOVING IN MULTIPLE COLUMNS

RELATED APPLICATIONS

Applicants are named inventors on U.S. application Ser. No. 10/172,965, which teaches and discloses an embodiment of a label platform disclosed herein and is incorporated by reference as if set forth in length and detail.

BACKGROUND OF THE INVENTION

1. Field of the Invention

The present invention relates to apparatus for applying labels to goods of any type, but having particular application to the application of labels to fruit and vegetables moving in a plurality of columns on a conveyer belt, the apparatus particularly adapted to permit positioning a greater number of labeling assemblies transverse to the conveyer in less linear space relative to the conveyer belt.

2. Description of the Prior Art

Most manufactured or harvested items on their journey during the manufacturing process or the post-harvest processing are subjected to travel at some point in time on a conveyer means, either for inspection, grading, or labeling, prior to their final packaging station. Applicant's invention has application to any situation where an item of manufacture requires the application of a label, but Applicant's apparatus has a special application to the application of labels on to fruit and vegetables.

The fruit and vegetables harvested from the field once cleaned and separated are normally fed onto a conveyer system in which the individual pieces of fruit and vegetables can be inspected, sorted, sized, graded and weighed. The elaborate computer assisted conveyer system utilized for this sorting, sizing, grading or weighing of fruits and vegetables automatically transfers similarly graded fruits or vegetables to their own separate conveyer means. Each piece of fruit or vegetable may be required to have a label affixed thereto. Since the effort has been undertaken to examine the fruit and vegetables and to sort it into the various grades, it is undesirable at this stage to damage the fruit or vegetable in the labeling process. Current state of the art machines will often times wound or mar the individual piece of fruit or vegetable in the labeling process.

The fruit and vegetables moving along a conveyer line do not always remain stationary, but sometimes rather, roll, spin and tumble as they are transported. Current state of the art label applicators will often times completely miss individual pieces of fruit and vegetables because of their motion. Still further, current state of the art label applicators cannot respond to random product sizes, shapes or weights, and this often times contributes to the wounding or marring of the surface of the fruit or vegetable or completely missing the labeling application.

As a result of these shortcomings in the prior art, the fruit and vegetable packers must employ additional people along the product line to watch for evidence of wounded fruit or vegetables or missed labels. They must also watch the labeling machines which are subject to jamming. They must also watch the conveyer means to insure that the labeling machines are applying the label to each and every piece of fruit and vegetable that requires labeling which is passing through the labeling station.

A still further draw back of the present art is that the computer assisted conveyer mechanism identifies the particular type of label to be put on a particular item or fruit or vegetable. When that particular item, fruit or vegetable reaches a particular station having that particular label, the label is applied. In large operations, the conveyer belt must be in communication with multiple stations having multiple labels. Each time a station is added to the conveyer line, the line must become longer in order to accommodate the removal of an item, fruit or vegetable having the same label into an alternate conveyer line for packing, or results in the blockage of existing alternative conveyors and/or stations. As an example, a conveyer line having five columns would need two stations spaced sufficiently apart in order to allow an item, fruit or vegetable being labeled at the first station to be removed before that column engages the second station. This leads to inefficiencies in productivity, blockage of conveyor product exits, reduction of off line packing stations, loss of profitability, and exaggerated costs in the length of conveyer systems. Applicant's apparatus is capable of positioning multiple labeling apparatus hereinafter referred to as a label or labeling platform on a common bridge spanning the conveyer line such that labels of a different type may be applied to the items, (fruit or vegetable) within a span of approximately 10½". Still further, the design of Applicant's bridge and labeling platform allows for the operator to make a quick replacement of a labeling platform when that mechanism has run out of labels since the bridge provides common utilities and vacuum to each of the plurality of labeling platforms through separate and discrete labeling stations.

Applicant's label applicator eliminates the wounding, bruising, crushing, peeling of scuffing of the fruit or vegetable, in that the machine does not come in contact with the individual piece of fruit and vegetable, but rather transfers the label by a vacuum jet process. Further, Applicant's label applicator requires no adjustment for random product sizes, shapes or weights, and insures that a label is applied regardless of whether the produce is rolling, spinning, tumbling or the like.

OBJECTS OF THE INVENTION

An object of the present invention is to provide a novel method and apparatus for applying labels to an item of manufacture or harvest in which multiple label platforms are positioned in relation to the conveyer belt on a common bridge having a plurality of label stations accommodating the labeling platforms providing common utilities and vacuum to each label station, each label platform capable of being quickly removed and replaced at each labeling station with a new labeling platform when depleted of labels.

Another object of the present invention is to provide for a novel method and apparatus for applying labels to items of manufacture or harvest which allows the operator to place more label platforms in relation to the conveyer mechanism without having to extend the length of the conveyer system.

Another object of the present invention is to provide for a novel apparatus for applying labels to items of manufacture or harvest.

Another object of the present invention is to provide for a novel apparatus for application of labels to items of manufacture or harvest which does not require the apparatus to come in contact with the item of manufacture or harvest.

A further object of the present invention is to provide for a novel apparatus for applying labels to fruits or vegetables which eliminates the bruising, crushing, peeling or scuffing of the fruit or vegetable.

A still further object of the present invention is to provide for a novel apparatus for the application of labels to fruit or vegetables which requires no adjustments for random product sizes, shapes or weights.

A still further object of the present invention is to provide for a novel apparatus for application of labels to fruits or vegetables which provides for application of the label regardless of whether the fruit or vegetable is rolling, spinning or tumbling.

A still further object of the present invention is to provide for a novel apparatus for the application of labels to fruits or vegetables which greatly reduces or eliminates the need for personnel to have to attend to the labeling process.

A still further object of the present invention is to provide for a novel apparatus for the application of labels to fruit or vegetables which increases productivity and decreases down time on the conveyer system.

A still further object of the present invention is to provide for an apparatus for the application of labels to fruits or vegetables which can run at higher speeds than that of the prior art.

A still further object of the present invention is to provide for a novel apparatus that does not require any label set up adjustment.

A still further object of the present invention is to provide for a novel apparatus that permits flexibility in label web tension, thus minimizing the possibility of the web breaking or tearing during the labeling process.

A still further object of the present invention is to provide for absolute minimal maintenance and service.

SUMMARY OF THE INVENTION

A method and apparatus for transferring a discrete pressure sensitive label from a continuous web of discrete pressure sensitive labels to a continuous series of discrete objects wherein the web and labels are mounted on a discrete labeling platform and are brought into contact tangentially with a perforated rotating transfer means mounted on a hub on the labeling platform, the web and labels in contact with the perforated rotating transfer means for a portion of its arc of circumference, the label being subjected to a vacuum during rotation while simultaneously redirecting the web away from the perforated rotating transfer means, the label maintaining contact with the rotating transfer means until registration with a pressure port at which point the label is subjected to a pressurized gas flow and is blown from the rotating ring to the object to be labeled when that object is in registration and alignment with the pressure port there being a plurality of labeling platforms mounted on one side or opposing sides of a bridge positioned relative to the continuous series of discrete objects, the bridge providing common utility and vacuum to each labeling platform so as to allow quick replacement of a depleted frame.

BRIEF DESCRIPTION OF THE DRAWINGS

These and other objects of the present invention will become apparent particularly when in light of the following illustrations wherein:

FIG. 1 is a front view of the one embodiment of a label applicator apparatus;

FIG. 2 is a close up front view of the label transfer means;

DETAILED DESCRIPTION OF THE INVENTION

Figure 3:
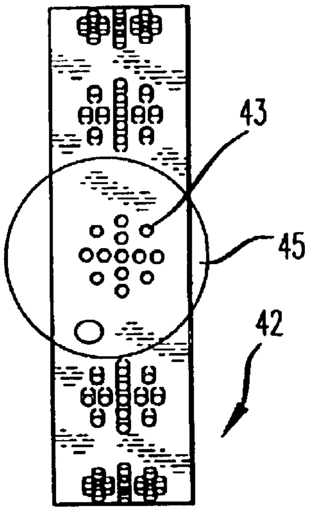
FIG. 3 is a side view of the surface of the label transfer means.
Figure 4:
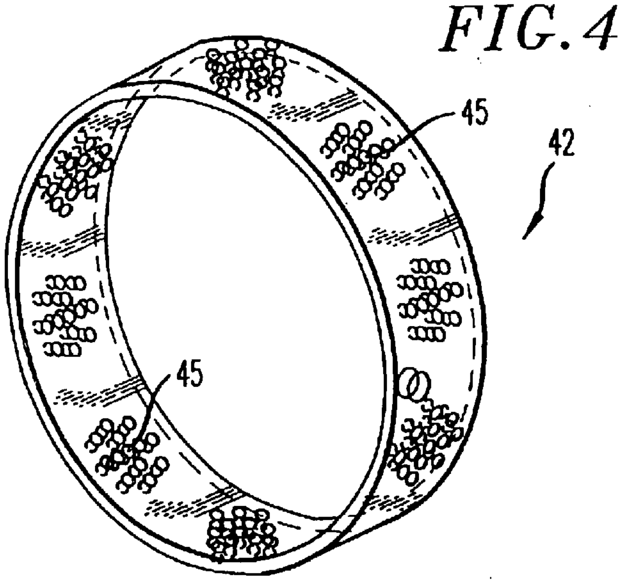
FIG. 4 is a perspective view of the rotary labeling ring associated with the label transfer means.

FIGS. 1 through 6 illustrate Applicant's novel apparatus and method for transferring labels as taught in U.S. application Ser. No. 10/172,965. The transfer means remains the same, however the label platform has been modified to cooperate with a multi station bridge member.

FIG. 1 is a perspective view of the label applicator apparatus 10 illustrating its use with the application of labels to round items. In the illustration of FIG. 1, label applicator apparatus 10 is oriented in a vertical position, but it should be pointed out that the label applicator 10 can be oriented angularly if the labeling process requires it. In FIG. 1 there is a vertically oriented support member 12 on which is mounted a web cradle 14 having an adjustable axle 16 for the rotatable support of a continuous web 18 having pressure sensitive adhesive labels affixed thereon. A series of rollers 20, 22, and 24 transport and guide the web and the associated labels into circumferential contact with that portion of the label applicator apparatus identified as the label transfer means 26.

At the label transfer means 26, the label on the web 18 is removed from the web 18 mechanically and temporarily affixed to a rotary or faceted ring 28 on the label transfer means 26 by means of a vacuum and may be assisted by a pressurized gas assist jet 23. The label remains on the rotating ring 28 until it comes in registration with a pressure port 30 (See FIG. 5) at which time the label is vac-jetted onto the item or product, in this case a round item. The web 18 once the label has been removed is guided by means of a variety of drive and guide rollers 32, 34, and 36 to a web collection means 37 as described hereafter. The web cradle 14 and the various drive and guide rollers are capable of being computer adjusted automatically in order to provide for the proper tension on the web during the labeling process. In addition, the web 18 may have perforations 39 along its longitudinal edges 19 cooperative with upstanding pins 33 on the various rollers to assist in guidance and transport (See FIG. 6).

FIG. 2 is a close up view of the label transfer means 26 portion of the label applicator. The label transfer means 26 consists of a stationary hub 40 about which there rotates a perforated ring 42 which serves as the outer surface of the label transfer means and is best viewed with respect to FIGS. 3 and 4. The perforations 43 are arranged in a pattern 45 with each pattern sized to hold a label 29 under vacuum.

In the illustration, the web 18 first engages the label transfer means 26 at the uppermost tangent of the rotating ring 42 and the web travels in a counter-clockwise direction. It should be noted the web enters the label transfer means 26 with the label 29 face facing downwardly and the adhesive portion of the label juxtaposed the web.

In the illustration, the web travels counter-clockwise on ring 42 to position 50 where the web 18 is subjected to an approximate 90 degree turn about peel edge 52 of peel plate 54. At that point of 90 degree turning of the web, the ring member 42 having a plurality of perforations 43 about its surface and perforation patterns 45 is subjected to a vacuum means 41 from a vacuum source, the conduit means for providing vacuum being positioned on the label frame applicator apparatus 10 in communication with hub member 40. Ring 42 is subjected to a vacuum continuously from position 50 to the point at which the label is to be applied to the particular goods. Thus the label 29 is now rotating on ring 42 with adhesive surface facing outwardly. For purposes of discussion in the instant matter, we will assume that the label will be positioned on the goods when ring 42 and the associated label have rotated to the bottom dead center position 58. Therefore ring 42 would be under constant vacuum from position 50 until approximate bottom dead center position 58. At that point, the ring 42 would be subjected to a positive pressure as described hereafter through the perforations 43 in the ring 42 and to the label side of the label 29 when the label and perforation are in registration with a pressure port 60, thus blowing or vac-jetting the label off of the ring 42 and onto the goods 11, adhesive side first.

It should be noted that dependent upon the pressure required, it is possible to fix a label to a goods 11 with the apparatus and method of the present invention when the gap between the surface of the goods 11 and the ring 42 could be several inches.

Ring 42 would continue to rotate about hub 40 after passing bottom dead center, but would not be subjected to any vacuum during this portion of the rotation. When the ring rotated back to position 50, where it then would be subjected to a vacuum means from within hub 40. The fact that the labels are affixed to the web, adhesive side down, and the labels are fed into the label transport means 26 such that the label is in contact with the perforations 43 on ring 42 and the adhesive layer faces outwardly greatly reduces machine down time from the build up of adhesive on the moving parts of the labeling assembly.

Figure 5:
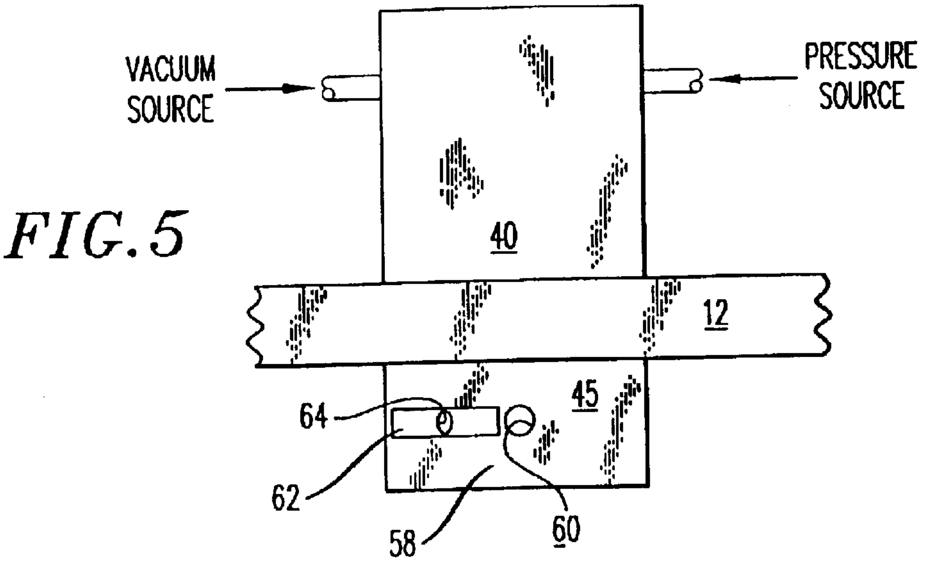
FIG. 5 is a partial underside view of the hub of label transfer means.
Figure 6:
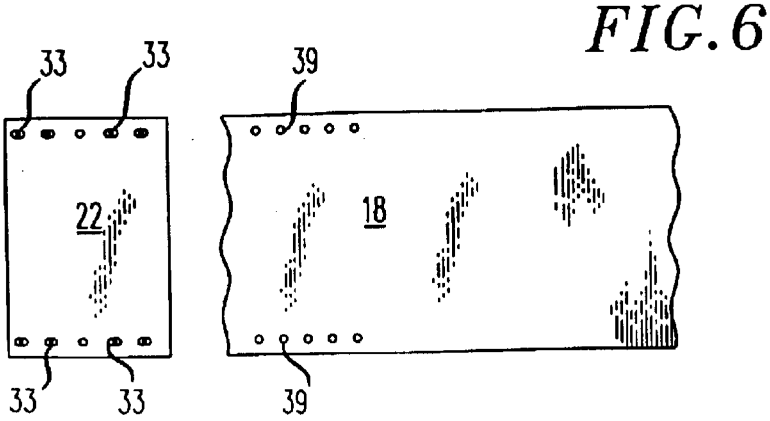
FIG. 6 is a partial top view of the web and roller illustrating the pin and perforation guide and drive mechanism.

FIG. 5 is a partial underside view of the hub 40 of the present invention with the rotating ring 42 removed. The ring would rotate about hub portion 45. It can be seen that for a portion of the arc of hub member 40 there is a recess slot 62 in communication with a conduit 64 which is in communication with a vacuum source or means (not shown). In operation this slot 62 extends from point 50 on ring 42 proximate the peel plate 54 and peel edge 52 to a point on the circumference of the hub immediately adjacent the pressure port 60 which for purposes of this illustration is located at the bottom dead center position 58. The pressure port 60 is in communication with a source of pressurized gas to vac-jet the label from ring 42 onto the goods to be labeled. When the label applicator apparatus 10 is operating, there is a constant vacuum drawn to slot 62. The pressurized gas directed to pressure port 60 may be continuous or may be intermittent and computer timed to the speed of rotation of ring 42 and speed of the goods 11. Similarly, it will be recognized by those of ordinary skill in the art that the internal piping of hub 40 and valving of such piping in order to provide the vacuum and pressurized gas may vary without departing from the spirit and scope of the invention.

For the illustration just discussed, we have assumed that the label will be affixed to the goods at the bottom dead center position 58 of the rotation of ring 42. It will be recognized that depending upon certain peculiarities with respect to labeling projects, the expiration point for the label 42 from the ring could be at a point other than bottom dead center position 58. The prerequisite is that the label be picked up by the vacuum means in association with ring 42 and held from the pick up point to the expiration point under vacuum. Still further, the feed of the web to the label transfer means could be clockwise and could also be vertical feed from above or below depending upon the configuration of the objects or goods transport configuration. The vacuum slot and pressure port would be oriented accordingly for such configuration.

FIGS. 7 through 13 are directed to and illustrate a novel multi station bridge member accommodating multiple labeling apparatus or hereinafter label platforms, the bridge supplying common source of power, pressure, vacuum and electronic circuitry to each label station and label platform.

Figure 7:
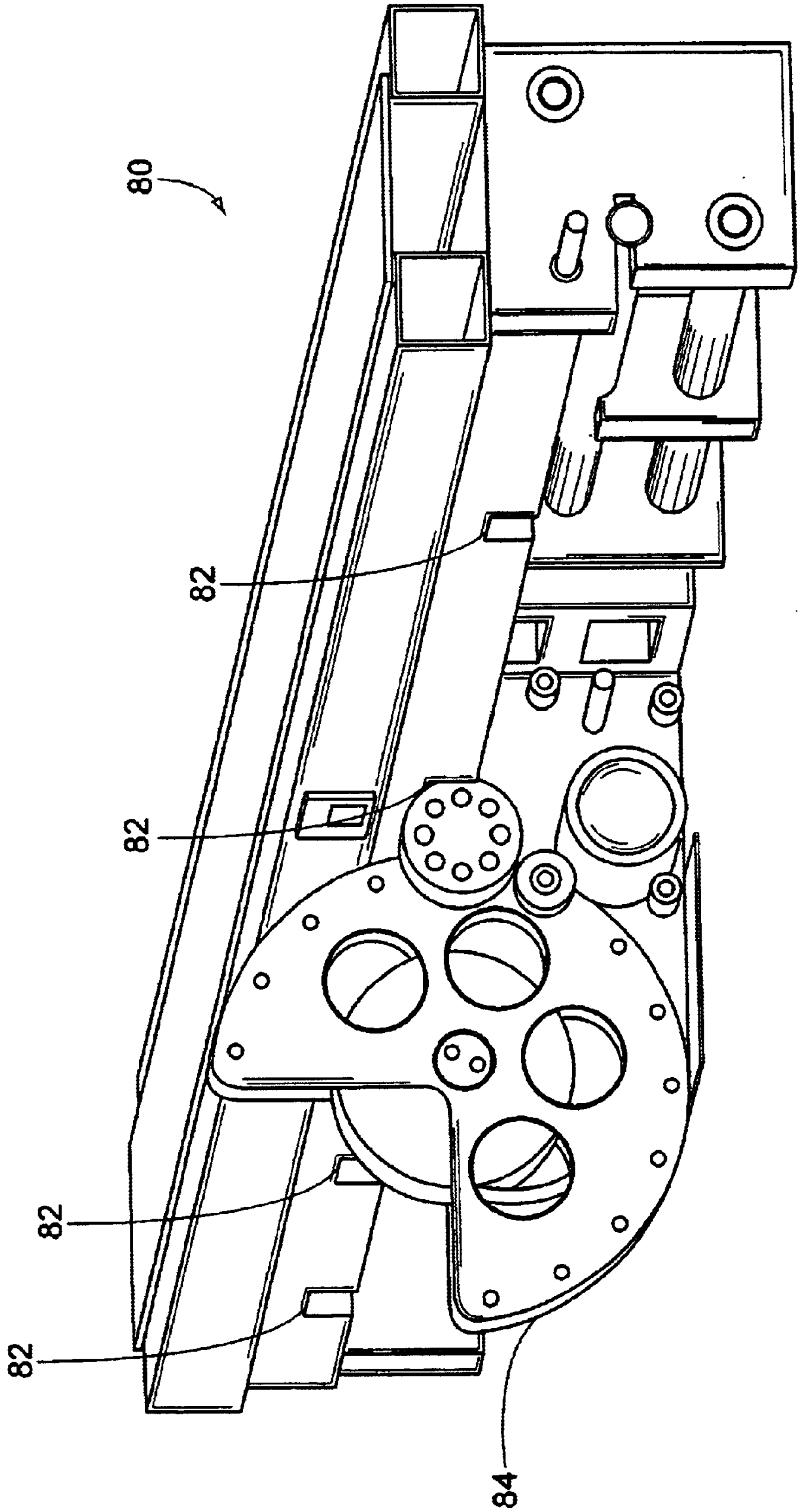
FIG. 7 is a perspective view of a bridge member and label platform.
Figure 8:
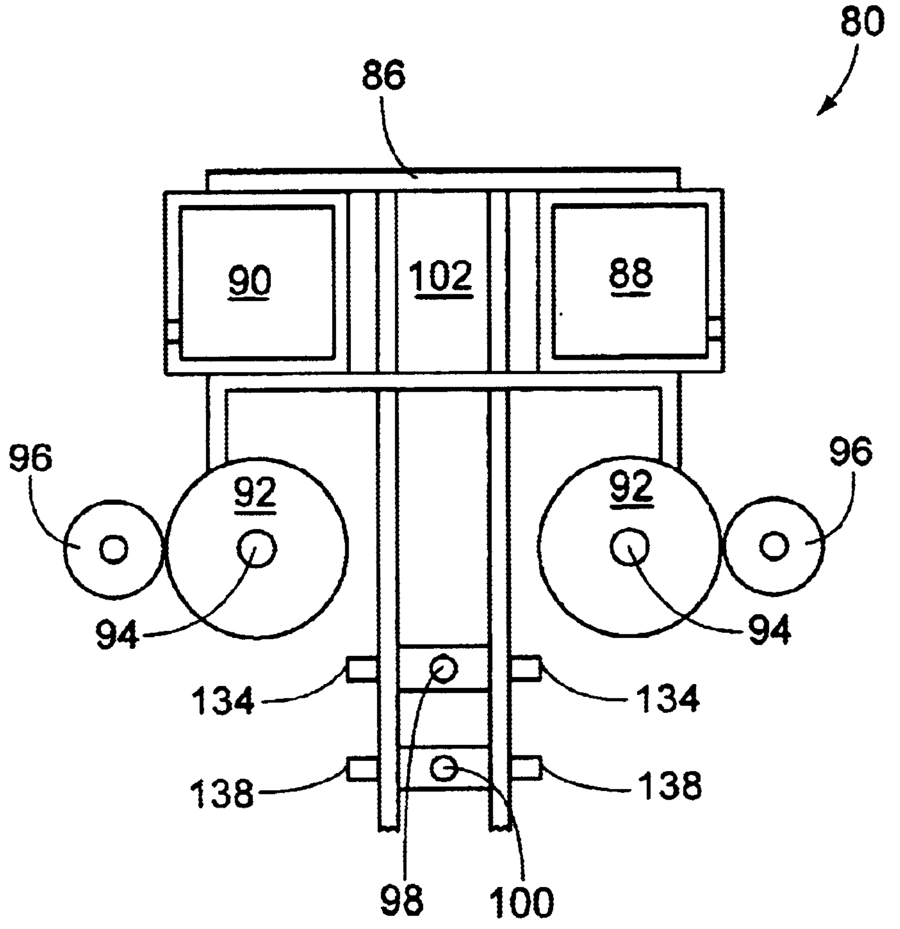
FIG. 8 is a cutaway end view of the bridge member.

FIG. 7 is a side view of the bridge member 80 which has a plurality of stations 82 positioned thereon which accommodate a plurality of label platforms 84. FIG. 8 is a cutaway end view of bridge member 80 illustrating the manner in which a common source of air, vacuum and utilities are supplied to each of the plurality of label stations 82 and label platforms 84 mounted on bridge member 80. Bridge member 80 may be dimensioned in length to span a conveyer belt of any desired width. This permits more label platforms 84 to be positioned relevant to the conveyer lines so as to negate the need for extending the conveyer belt to allow for the positioning of more label platforms. Bridge member 80 comprises a support frame 86 which supports scrap vacuum tubes 88 and 90 on the upper portion of support frame 86. In FIG. 8, there is illustrated two scrap vacuum tubes 88 and 90 on opposing sides of the support frame 86 in that the bridge member discussed herein would have label stations 82 and label platforms 84 positioned on both sides of the bridge member 80. Therefore the scrap web material from each of such label platforms would be removed from the line by the respective scrap vacuum tubes 88 or 90 to a collection receptacle. Mounted on support frame 86 of bridge member 80 below the scrap vacuum tubes 88 and 90, are drive gears 92 associated with each label station 82. The drive gears 92 are run by a motor means (not shown) positioned at one end of the bridge member 80, the drive gears 92 being mounted on a common axle 94 for each side of the bridge member 80. Drive gears 92 are in communication with a clutch gear 96 mounted on each label platform 84, which in turn causes the rotation of the web and drive gears mounted on label platform 84. Mounted below drive gears 92, there is positioned a common air manifold 98 for delivering pressurized air to each of the label platforms 84 mounted on each label station 82, bridge member 80 and a vacuum manifold 100 for providing vacuum to each of the label platforms 84 mounted on bridge member 80 in order to transfer the labels from the web to the product in accordance which the method and apparatus heretofore described. The bridge member 80 also provides for the common electrical connection conduit 102 of each label platform 84 and station 82 to the centralized computer processing unit so that signals can be sent to the label platform when it is appropriate to apply a label to a product passing beneath it. Such a signal would allow the drive gear to engage the clutch gear, such that the web 18 on the respective label platform 84 would rotate so as to present a label 29 to the pressure port 60 of the respective label transfer means 26 to be vac-jetted onto the product 11.

Figure 9:
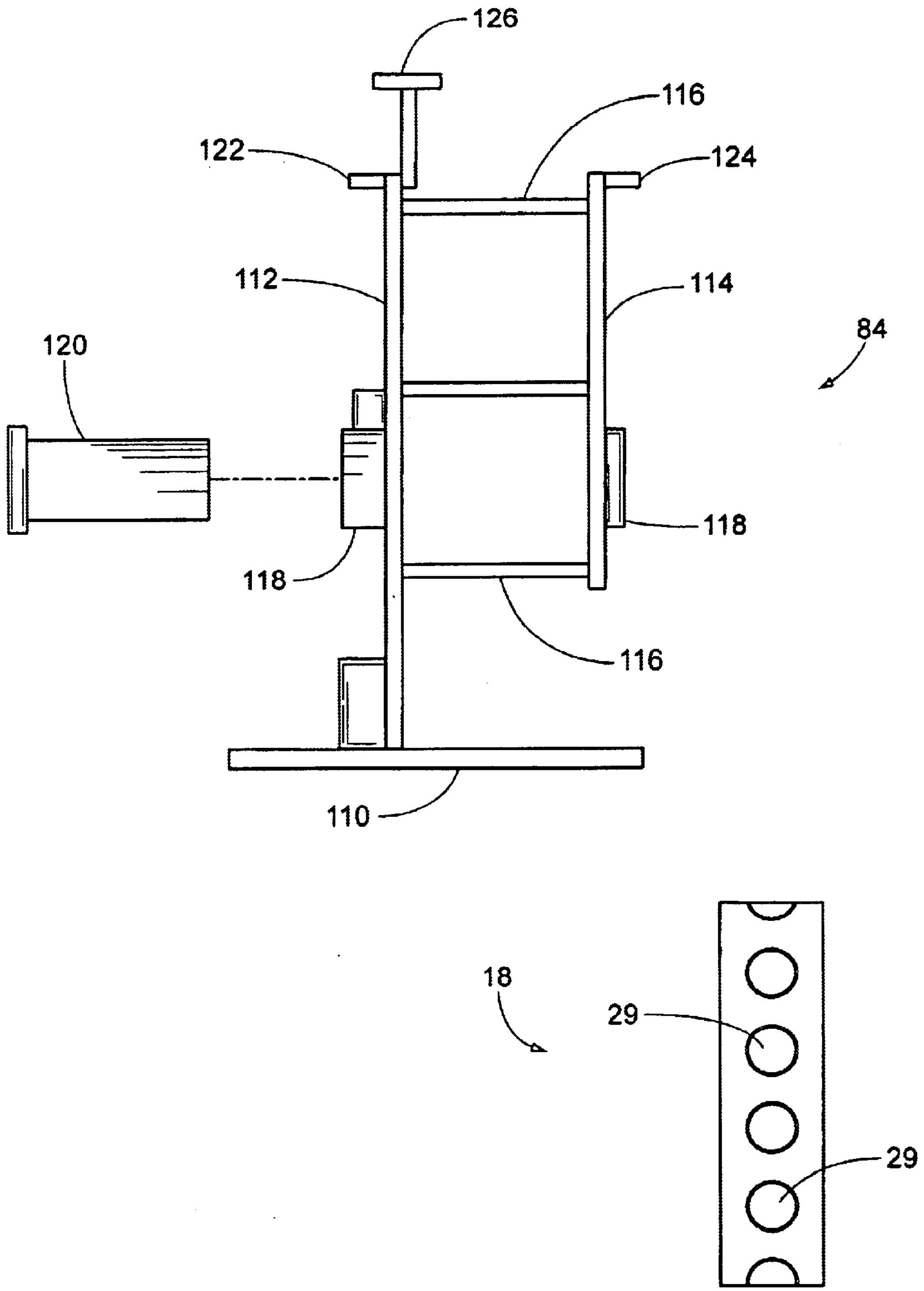
FIG. 9 is an exploded rear view of a label platform and web.

FIG. 9 is an exploded rear view of label platform 84 and web 18. Label platform 84 comprises a base member 110 supporting a first spaced apart wall member 112 and a second spaced apart wall member 114, first spaced apart wall member 112 being secured to the base member 110. Second spaced apart wall member 114 is secured to first spaced apart wall member 112 by means of a plurality of cross members 116 secured therebetween. The spaced apart relationship between first and second wall member 112 and 114 allows the web 18 and labels 29 to be inserted between first and second wall members 112 and 114. The two piece hub member 118 is secured to first and second side wall members 112 and 114 to allow an axle member 120 to be inserted through the two piece hub member 118. Axle member 120 is withdrawn to allow the web 18 to be inserted between first and second wall members 112 and 114 and then the axle member 120 is inserted through the hub members and central core of web 18 to secure it in position. The web is therefore allowed to freely rotate about axle member 120 between first and second spaced apart wall members 112 and 114.

First and second spaced apart wall members 112 and 114 have an outwardly extending support peg 122 and 124 located proximate its upper edge, support pegs 122 and 124 cooperative with bridge member 80 to removably secure label platform 84 to bridge member 80 at any one of the label stations 82 as hereinafter described. First wall member 112 also has a handle means 126 secured thereto to allow for the positioning and removal of the label platform 84 from the label station 82 on bridge member 80.

Figure 10:
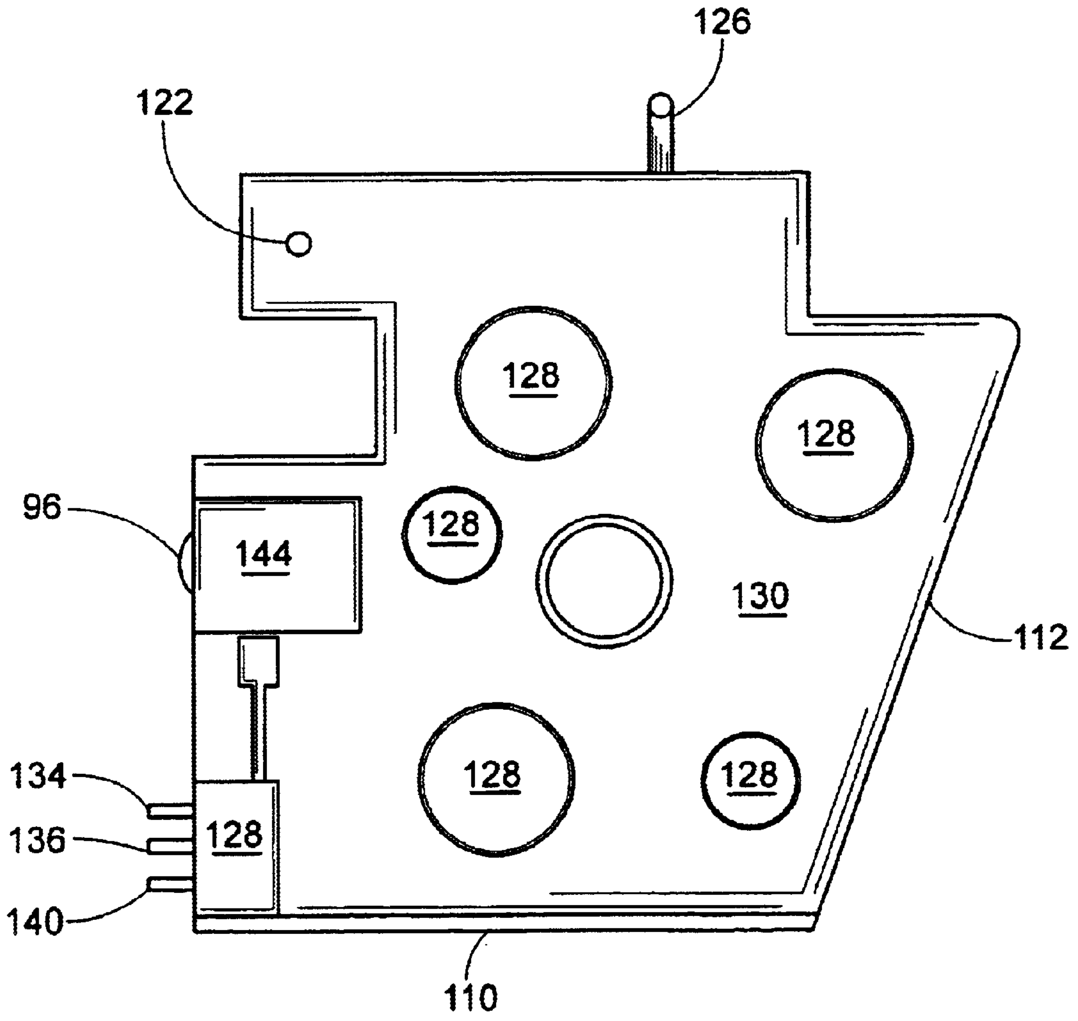
FIG. 10 is a first side view of a label platform.

FIG. 10 is a side view of first wall member 112 of label platform 84. A plurality of apertures 128 are formed in first wall member 112 in order to decrease the weight of the overall label platform 84.

There is positioned on first wall member 112 of label platform 84 a first control box 128 positioned adjacent base member 110 and the outer face 130 of first wall member 112 having a first male connector 132 for communication with a first female receptacle 134 on bridge 80 for communication with pressurized air manifold 98. A second male connector 136 in communication with first control box 128 is for communication with a second female receptacle 138 on bridge member 80 for communication with vacuum manifold 100.

A third male connector 140 on first control box 128 is for communication with a third female receptacle 142 on bridge member 80 for electronic communication with the electronics 102 within bridge member 80 in communication with the central computer station (not shown).

A second control box 144 is juxtaposed the outer face 130 of first side wall 112 housing clutch gear 96 mounted therein in communication with drive gear 92 positioned on bridge member 80, this second control box 144 is in communication with first control box 128 and the label transfer means 26, so as to provide vacuum to the label transfer means 26 and pressure to pressure port 60 and to further provide rotational drive to the web 18 as directed by the computer to bring labels 29 in registration with the pressure port 60.

Figure 11:
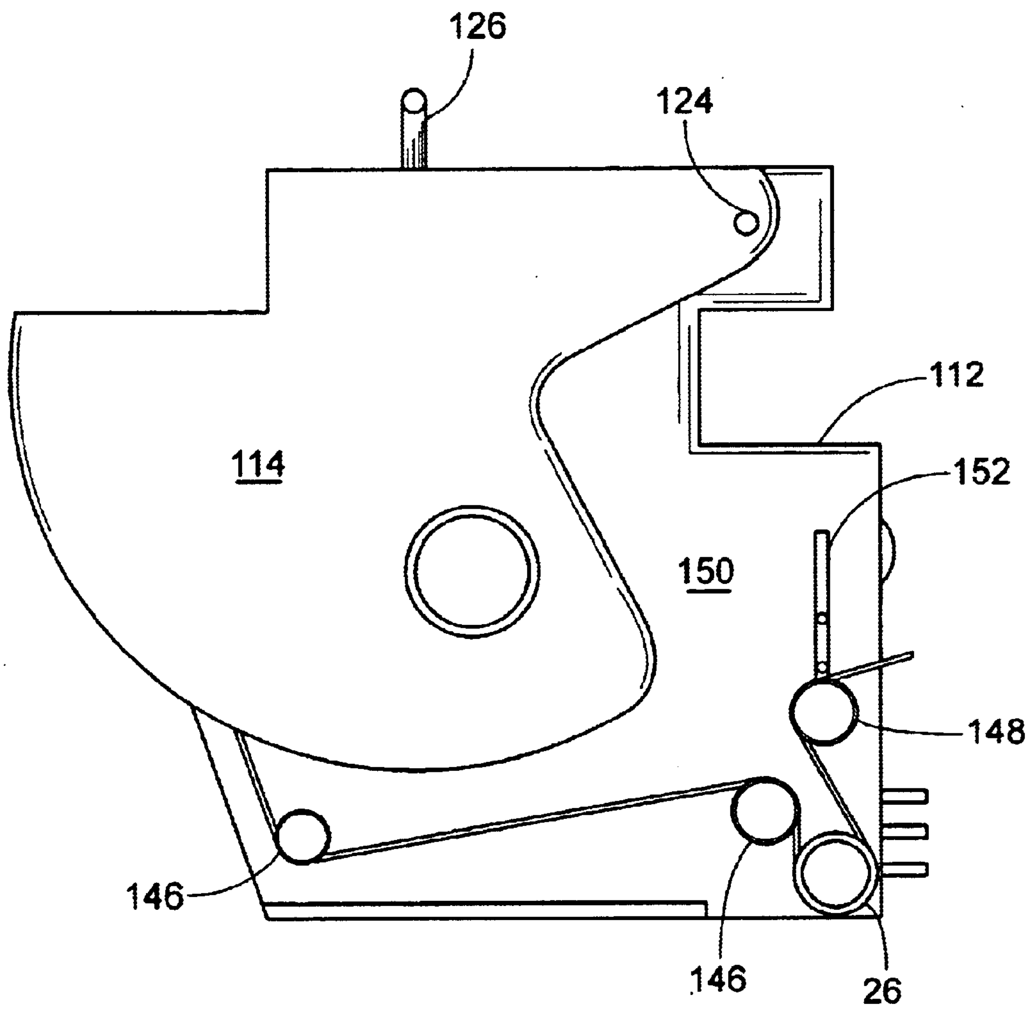
FIG. 11 is s second side view of a label platform.

FIG. 11 is a side view of the second wall 114 of label platform 84. Second side wall 114 is not secured to base member 110, but is supported by means of a plurality of cross members 116 between first side wall 112 and second side wall 114 as illustrated in FIG. 9. There are a plurality of idler rollers 146 and directional rollers 148 mounted on the inner face 150 of the first side wall 112 in order to direct and control the web 18 to label transfer means 26. A tensioner 152 controls the tension on the web as it passes through label transfer means 26 and the spent web 18, after having the labels vac-jetted onto the product or produce, is directed to an intake slot 154 in scrap vacuum tube 88 or 90 for collection at a scrap receptacle.

Figure 12:
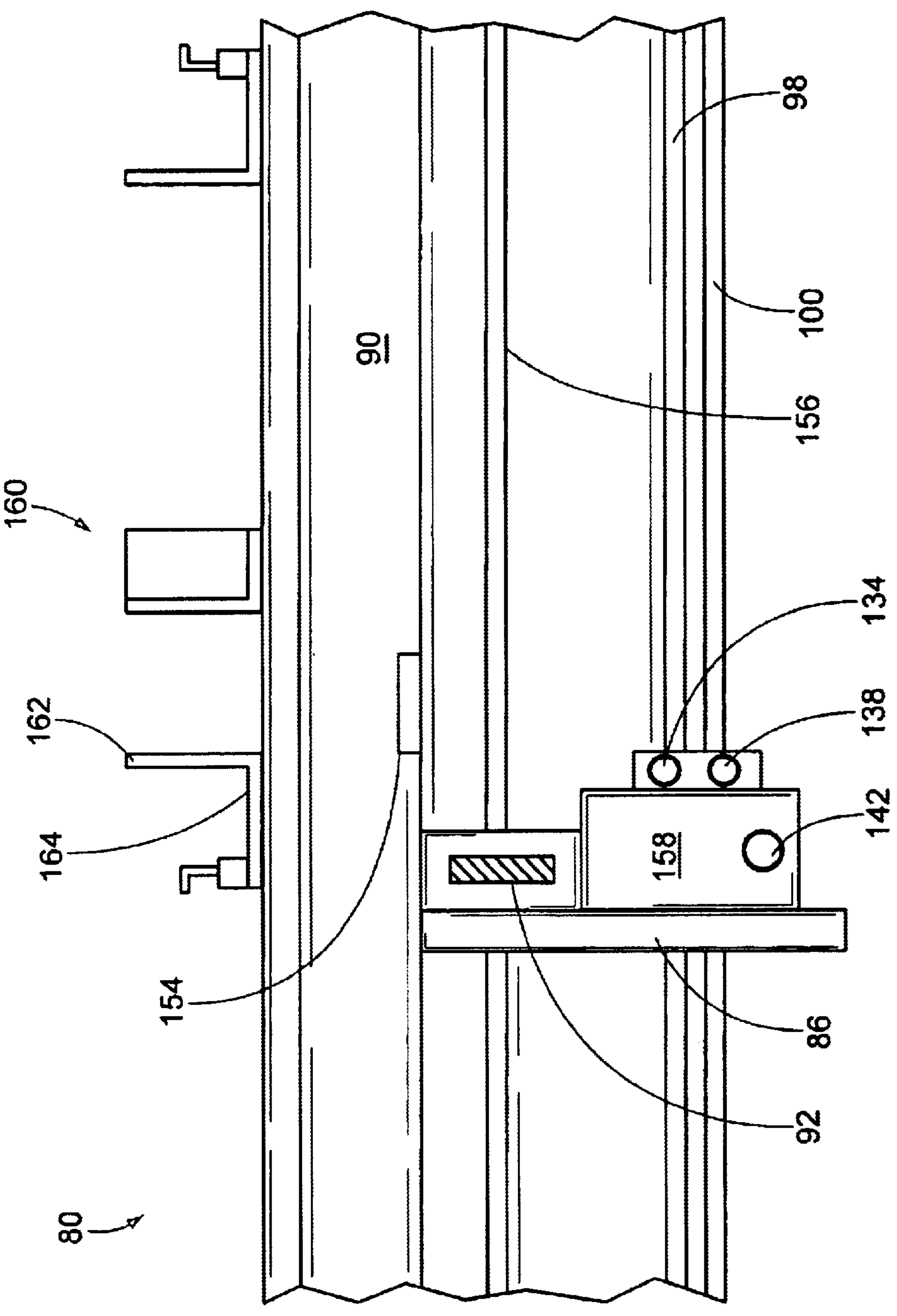
FIG. 12 is a side view-of a single label station on the bridge member.
Figure 13:
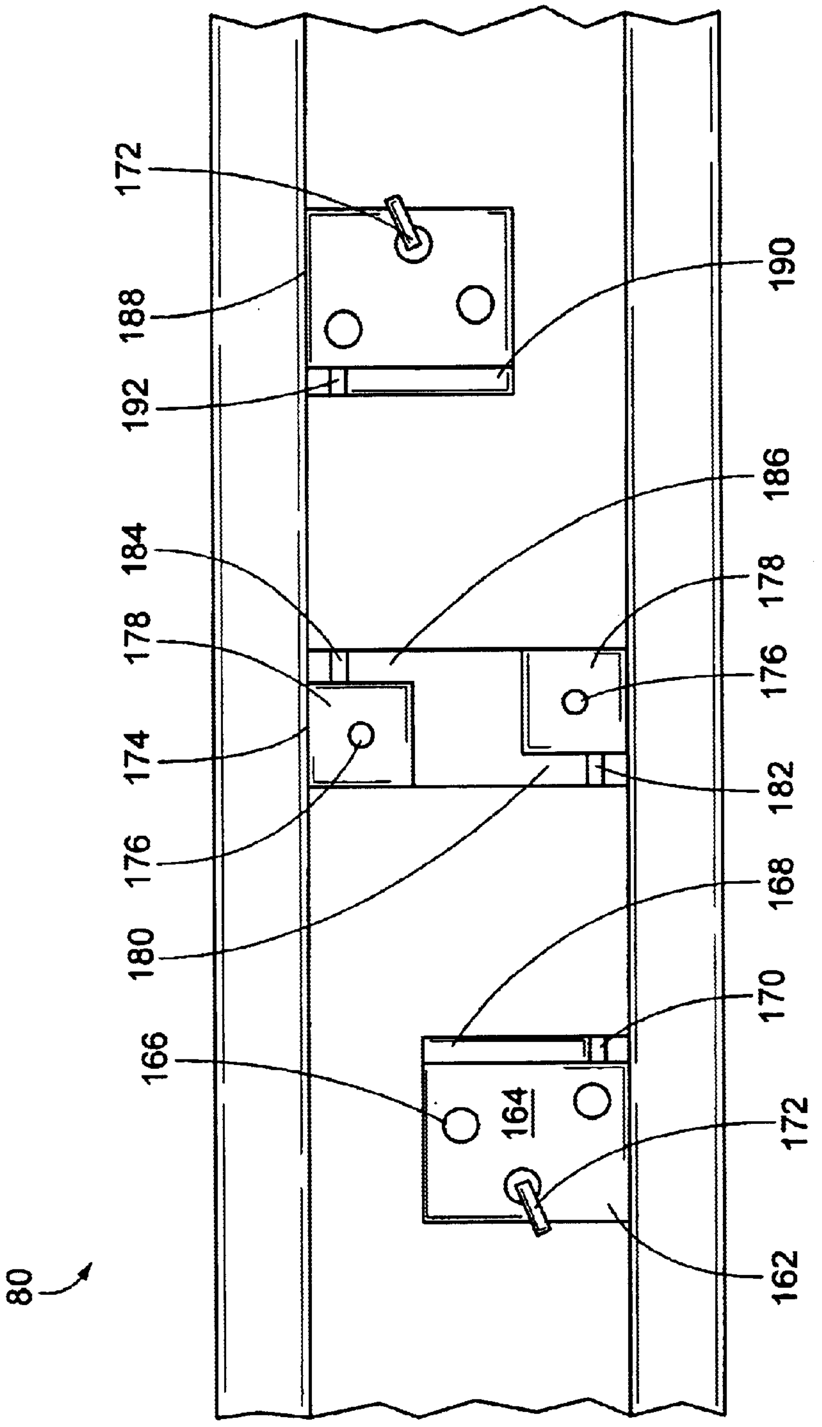
FIG. 13 is a top view of a label station on a bridge member.

FIGS. 12 and 13 are partial side views and partial top views of one of a plurality of label stations 82 positioned on bridge member 80 to aid in an understanding of how each label station 82 cooperates with label platform 84 to allow for quick connect and quick disconnect of a label platform when the labels 29 on web 18 have been depleted. There is shown bridge member 80 and support frame 86 with scrap vacuum tubes 88 and 90 and a scrap vacuum tube slot 154 for collection of the spent web 18 after the labels have been transferred. There is also shown drive gear 92 mounted on shaft 156 which would be driven by a motor (not shown) positioned at one end of bridge member 80. There is also positioned on bridge member 80 and support frame 86 a third female electrical receptacle 142 and junction box 158 for transfer of signals to the label platform 84 from the central computer station (not shown). There is also positioned on bridge member 80 and support frame 86 a female air pressure receptacle 134 and an air pressure line 98 supplying air pressure to all of the label stations 82 and subsequently to the label platforms 84. There is also shown a female vacuum receptacle 138 and vacuum line 100 for cooperation with the male receptacles positioned on label platform 84 for supplying a vacuum to the label platforms 84 and in particular to the label transfer means 26.

A mounting means 160 for the label platform 84 is positioned at each label station 82 above the scrap vacuum tubes 88 and 90. The mounting means is designed sodas to provide for a mount for a label platform 84 on each side of bridge member 80 in a staggered configuration. The mounting means 160 comprises a first L-shaped in cross section bracket member 162 having a horizontal surface 164 secured to bridge member 80 by fasteners 166. Upstanding leg member 168 has a cross notch receptacle 170 for receipt of support peg 122 positioned on said first spaced apart wall member 12 of said label platform 84. Also positioned on first L-shaped in cross section bracket 162 is a rotational locking means 172 locking said male receptacles to said female receptacles for said electronics, vacuum and air pressure. The label platform 84 when placed into service automatically locks into the female receptacles. It is necessary to remove the label platform 84 after depletion of labels by rotating the locking means 172 to release the male members from the female receptacles.

Mounting means 160 further comprises a double L-shaped bracket member 174 secured to bridge member 80 by fasteners 176 through horizontal portions 178. The first vertical leg 180 of double L-shaped bracket 174 has a cross notch receptacle 182 for receipt of support peg 124 from second wall 114 of label platform 84. The second vertical leg 184 of double L-shaped bracket 174 has a cross notch receptacle 186 for receipt of a support peg 124 from a second wall 114 of a label platform 84 which would be removably secured to a label station 82 on the opposing side of bridge member 80.

A third L-shaped in cross section mounting bracket 188, similar to the first L-shaped in cross section bracket is mounted on bridge member 80 proximate the opposing side and secured in the same manner. Its vertical leg 190 would have a cross notch receptacle 192 for receipt of a support peg 122 from the first side wall 112 of another label platform 84 mounted on the opposing side of bridge member 80 and offset from the label platform 84 on the opposing side. It would similarly have a rotational locking means 172 for locking the label platform in position and releasing the label platform once the labels had been depleted. In this configuration, three brackets can support two label platforms 84 on opposing sides of bridge member 80 in a staggered configuration.

In operation, bridge member 80 would be positioned transverse to an assembly/conveyor line with appropriate motor for rotational drive of the drive gears 92. The vacuum line and air pressure line would be secured and the scrap vacuum tube would be secured. The required number of label platforms 84 with web 18 and labels 29 would be positioned at the appropriate label stations 82 and the web would be threaded through the label transfer means 26. This would be accomplished by lifting the label platforms 84 by handle 126, engaging support pegs 122 and 124 in the cross notches 170 and 182 of the L-shaped brackets 162 and 174, and then rotating the label platform 84 downwardly locking the male vacuum 136, male air pressure 134, and male electrical members 140 into their female counterparts 138, 134, and 140 respectively. The motor, vacuum manifold, air pressure manifold, and scrap web tube and electrical connections would then be simultaneously activated with the commencement of the conveyor motion. Each label platform 84 would receive electrical instructions from the central computer system with respect to the vacu-jetting of a label 29 onto the product or produce 11 passing there beneath on the conveyor belt. As a discrete label platform 84 is depleted of labels 29, an operator would twist the rotational locking means 172 to release the male members from their respective female receptacles and rotate the label platform 84 away from and upwardly from the bridge 80 to lift it from position and disengage support pegs 122 and 124 from cross notches 170 and 182, The depleted label platform 84 would be replaced by a fully loaded label platform 84 with web and labels and the depleted label platform 84 would be refilled for future use at any one of the label stations 82 on bridge member 80. The disconnection and reconnection of a label platform 84 from a label station 82 provides for an automatic signal to the central computer of the status of that particular label station and label platform.

The design of this label assembly allows for significantly more labels to be applied to a product or produce in a limited linear space on a conveyor line, thus reducing costs of conveyor space and also reducing the cost of labor since a label platform can be changed out more quickly and easily.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. A method of transferring discrete pressure sensitive adhesive labels from a plurality of web carriers mounted on a plurality of labeling platforms to a continuous series of objects in multiple columns on a transport mechanism traveling transverse to said label applicator assembly, said method comprising the following steps:

a. positioning a bridge member transverse to said transport mechanism, said bridge member having an upper surface and two opposing side walls depending therefrom, said bridge member having a plurality of labeling stations, said bridge member having a first transverse conduit in communication with a vacuum source, second transverse conduit in communication with a pressurized gas source and a third transverse conduit having an electrical connections and in communication with a computer station, each of said labeling stations in communication with said first, second and third transverse conduits, said bridge member having a motor means mounted at an end thereof in communication with a transverse shaft means within said bridge member, said transverse shaft means having mounted thereon a plurality of gear members positioned at each of said label stations;

b. positioning a source of labels affixed to a wound continuous web on a plurality of labeling platforms, each of said labeling platform comprising a frame and axle for the rotatable support of said wound continuous web and said labels, said frame having mounted thereon a plurality of directional, tensioning and drive rollers for tensioning, directing and driving said web, said frame further having a label transfer means for transfer of said label from said web to said transfer means and thence to said objects to be labeled, said label transfer means comprising a hub having a ring rotatably mounted thereon, said ring having a plurality of discrete perforation patterns, said hub having a recessed slot formed in its circumferential periphery in alignment with said ring for a portion of said hub circumference, said slot in communication through said hub to a vacuum source, said slot having a label engaging end and a label release end, said hub having a pressure port formed in its circumference proximate to said label release end of said slot, said pressure port in communication through said hub with a pressurized gas source, a peel plate adjacent said ring and having a peel edge positioned proximate said label engaging end of said slot, said peel plate redirecting said web without labels from said ring to a plurality of directional tensioning and drive rollers, said label being transferred to said peel edge from said web to said ring under the influence of vacuum and maintained on said ring until registration with said pressure port when said label is jetted from said ring onto said object to be labeled;

said label platform further including a release clutch and gearing mechanism mounted on said frame in communication with said drive rollers; a vacuum connection mounted on said frame of said label platform for communication with a vacuum source; a pressure connection mounted on said frame of said label platform in communication with said pressurized gas source; an electrical connection mounted on said frame of said label platform in communication with a computer station for signaling said label platform for rotation and application of said label;

c. mounting said plurality of label platforms to said label stations on said bridge member;

d. engaging the label platform vacuum connection, pressurized gas connection and electrical connection with said vacuum connection, pressurized gas connection and electrical connection of said label station;

e. activating the source of vacuum, pressurized gas, and electrical connections;

f. initiating motor means on said bridge member;

g. initiating transport mechanism with said objects to be labeled;

h. signaling said respective labeling platform from a computer station via said electrical connection of an object to be labeled by said respective labeling platform;

i. engaging said respective gear at respective label station on said bridge member with said release clutch and gearing mechanism mounted on said label platform;

j. rotating said web and labels to transfer a label from said web to said label transfer means by vacuum;

k. registering said label at said pressure port;

l. transferring said label from said label transfer means to said object to be labeled under the influence of said pressurized gas;

m. collecting that portion of said web from which labels have been removed;

n. repeating steps h through m until said web is depleted; replacing said label platform with said web depleted with a label platform having said web and said labels.

2. The method in accordance with claim 1 wherein the labels on said web are transferred to said ring with the adhesive side facing outwardly.

3. The method in accordance with claim 1 wherein a pressurized gas assist jet is positioned proximate the said peel plate and said ring to assist in the transfer of said label from said web to said ring.

4. The method in accordance with claim 1 wherein said plurality of directional, tensioning and drive rollers and said ring on said label transfer means are formed with pins on their circumferential periphery proximate their ends and said web is formed with perforations on its longitudinal edges cooperative with said pins for the guidance and transport of said web.

5. A label applicator assembly for transferring discrete pressure sensitive adhesive labels from a plurality of webs mounted on a plurality of labeling platforms to a continuous series of objects on a transport mechanism traveling transverse to said label applicator assembly, said label applicator assembly comprising:

a source of labels affixed to a wound continuous web, said web mounted on a label platform, said label platform comprising a frame and axle for the rotatable support of said wound continuous web and said labels, said frame having mounted thereon a plurality of directional, tensioning and drive rollers for tensioning, directing, and driving said web;

said frame having a label transfer means for transfer of said label from said web to said transfer means and thence to said objects to be labels, said label transfer means comprising a hub having a ring rotatably mounted thereon, said ring having a plurality of discrete perforation patterns, said hub having a recess slot formed in its circumferential periphery in alignment with said ring for a portion of said hub circumference, said slot in communication through said hub to a vacuum source, said slot having a label engaging end and a label release end, said hub having a pressure port formed in its circumference proximate to said label release end of said slot, said pressure port in communication through said hub with a pressurized gas source, a peel plate adjacent said ring and having a peel edge positioned proximate said label engaging end of said slot, said peel plate redirecting said web without labels from said ring to a plurality of directional, tensioning and drive rollers, said label being transferred to said peel edge from said web to said ring under the influence of vacuum and maintained on said ring until registration with said pressure port when said label is jetted from said ring onto said object to be labeled;

a release clutch and gearing mechanism mounted on said frame in communication with said drive rollers;

a vacuum connection mounted on said frame of said label platform for communication with a vacuum source;

a pressurized gas connection mounted on said frame of said label platform for communication with said pressurized gas source;

an electrical connection mounted on said frame of said label platform in communication with a computer station for signaling said label platform for rotation and application of said label;

a bridge member, said bridge member having an upper surface and two opposing side walls depending therefrom, said bridge member of a length sufficient to transversely span said transport mechanism when said bridge member is secured in position, said bridge member comprising a plurality of label stations for the mounting of a plurality of said label platforms, said bridge member having a first transverse conduit in communication with a vacuum source, a second transverse conduit in communication with said pressurized gas source, and a third transverse conduit having electrical connections in communication with said computer station;

said bridge member having a motor means mounted at an end thereof in communication with a transverse shaft means within said bridge member said transverse shaft means having mounted thereon a plurality of gear members positioned at each of said label stations, each of said gear members in rotational communication with said release clutch and said gear members mounted on said label platforms;

said bridge member having positioned at each label station a vacuum connection, a pressurized gas connection, and an electrical connection for mating with said respective said vacuum connection, said pressurized gas connection, and said electrical connection mounted on said label platform when said label platform is positioned at said label station, said bridge member having positioned at each label station a take up aperture in communication with a take up conduit within said bridge member for the collection and removal of said web after said labels having been removed;

a securing means for the quick mounting and release of said label platform from said label station on said bridge member.

6. The label applicator assembly in accordance with claim 5 wherein said labels on said web are transferred to said ring with the adhesive side facing outwardly.

7. The label applicator assembly in accordance with claim 5 wherein a pressurized gas assist jet is positioned proximate to said peel plate and said ring to assist in the transfer of said label from said web to said ring.

8. The label applicator assembly in accordance with claim 5 wherein said ring is formed with a plurality of upstanding pins on its circumferential edges and said web is formed with perforations on its longitudinal edges cooperative with said upstanding pins for guidance and transport of said web.

9. The label applicator assembly in accordance with claim 5 wherein said plurality of label stations on said bridge member are positioned on said two opposing side walls in a staggered orientation.

10. The label applicator assembly in accordance with claim 5 wherein said securing means on said bridge member for said label platforms comprises two opposing pin members formed on said frame of said label platform cooperative with two opposing pivot slots formed on a mounting pedestal on said upper surface of said bridge member and said mating connections before said vacuum, said pressurized gas and said electrical connections positioned on said frame member and said bridge member respectively, said vacuum, said pressurized gas and said electrical connections being released by a release switch positioned on said upper surface of said bridge member.

11. The label applicator assembly in accordance with claim 5 wherein each of said label platforms at each of said label stations on said bridge member operate independently and each label platform is removably replaced when said web is depleted of said labels.

12. A bridge member for support of and supply of utilities to a plurality of labeling platforms for transferring discrete pressure sensitive adhesive labels from a plurality of webs mounted on said plurality of labeling platforms to a continuous series of objects on a transport mechanism traveling transverse to said labeling platforms wherein said labeling platforms comprise a source of labels affixed to a wound continuous web, said web mounted on said labeling platform, said label platform comprising a frame and axle for the rotatable support of said wound continuous web and said labels, said frame having mounted thereon a plurality of directional, tensioning and drive rollers for tensioning, directing, and driving said web, said frame having a label transfer means for transfer of said label from said web to said transfer means and thence to said objects to be labels, said label transfer means comprising a hub having a ring rotatably mounted thereon, said ring having a plurality of discrete perforation patterns, said hub having a recess slot formed in its circumferential periphery in alignment with said ring for a portion of said hub circumference, said slot in communication through said hub to a vacuum source, said slot having a label engaging end and a label release end, said hub having a pressure port formed in its circumference proximate to said label release end of said slot, said pressure port in communication through said hub with a pressurized gas source, a peel plate adjacent said ring and having a peel edge positioned proximate said label engaging end of said slot, said peel plate redirecting said web without labels from said ring to a plurality of directional, tensioning and drive rollers, said label being transferred to said peel edge from said web to said ring under the influence of vacuum and maintained on said ring until registration with said pressure port when said label is jetted from said ring onto said object to be labeled, a release clutch and gearing mechanism mounted on said frame in communication with said drive rollers, a vacuum connection mounted on said frame of said label platform for communication with a vacuum source, a pressurized gas connection mounted on said frame of said label platform for communication with said pressurized gas source, an electrical connection mounted on said frame of said label platform in communication with a computer station for signaling said label platform for rotation and application of said label, said bridge member comprising:

an elongate beam, said bridge member having an upper surface and two opposing side walls depending therefrom, said bridge member of a length sufficient to transversely span said transport mechanism when said bridge member is secured in position, said bridge member comprising a plurality of label stations for the mounting of a plurality of said label platforms, said bridge member having a first transverse conduit in communication with a vacuum source, a second transverse conduit in communication with said pressurized gas source, and a third transverse conduit having electrical connections in communication with said computer station;

said bridge member having a motor means mounted at an end thereof in communication with a transverse shaft means within said bridge member said transverse shaft means having mounted thereon a plurality of gear members positioned at each of said label stations, each of said gear members in rotational communication with said release clutch and said gear members mounted on said label platforms;

said bridge member having positioned at each label station a vacuum connection, a pressurized gas connection, and an electrical connection for mating with said respective said vacuum connection, said pressurized gas connection, and said electrical connection mounted on said label platform when said label platform is positioned at said label station, said bridge member having positioned at each label station a take up aperture in communication with a take up conduit within said bridge member for the collection and removal of said web after said labels having been removed;

a securing means for the quick mounting and release of said label platform from said label station on said bridge member.

* * * * *